United States Patent
Armstrong et al.

(10) Patent No.: US 10,417,090 B2
(45) Date of Patent: Sep. 17, 2019

(54) COMPUTING SYSTEM WITH DATA PROTECTION MECHANISM AND METHOD OF OPERATION THEREOF

(71) Applicant: CNEXLABS, Inc., San Jose, CA (US)

(72) Inventors: Alan Armstrong, Los Altos, CA (US); Patrick Lee, San Jose, CA (US); Yiren Ronnie Huang, San Jose, CA (US)

(73) Assignee: CNEX LABS, Inc., San Jose, CA (US)

( * ) Notice: Subject to any disclaimer, the term of this patent is extended or adjusted under 35 U.S.C. 154(b) by 308 days.

(21) Appl. No.: 14/328,770

(22) Filed: Jul. 11, 2014

(65) Prior Publication Data

US 2015/0248331 A1 Sep. 3, 2015

Related U.S. Application Data

(60) Provisional application No. 61/946,710, filed on Mar. 1, 2014.

(51) Int. Cl.
*G06F 11/10* (2006.01)
*G06F 11/24* (2006.01)

(52) U.S. Cl.
CPC .... *G06F 11/1076* (2013.01); *G06F 2211/109* (2013.01); *G06F 2211/1028* (2013.01)

(58) Field of Classification Search
CPC .............. G06F 11/1076; G06F 3/06; G06F 2211/1028; G06F 2211/109
See application file for complete search history.

(56) References Cited

U.S. PATENT DOCUMENTS

| | | | |
|---|---|---|---|
| 4,719,628 A | 1/1988 | Ozaki et al. | |
| 5,721,739 A * | 2/1998 | Lyle | G06F 11/1068 714/755 |
| 5,875,477 A * | 2/1999 | Hasbun | G11C 29/765 711/103 |
| 6,048,090 A | 4/2000 | Zook | |
| 2004/0036997 A1 | 2/2004 | Hetzler et al. | |
| 2007/0150791 A1 | 6/2007 | Gross et al. | |
| 2008/0282105 A1* | 11/2008 | Deenadhayalan | G06F 11/1076 714/6.12 |

(Continued)

FOREIGN PATENT DOCUMENTS

| | | |
|---|---|---|
| CN | 102906712 A | 1/2013 |
| TW | 200509085 | 3/2005 |

(Continued)

OTHER PUBLICATIONS

Chengen Yang, Y. E. (2011). Product Code Schemes for Error Correction in MLC NAND Flash Memories. IEEE, 2302-2314.

*Primary Examiner* — April Y Blair
*Assistant Examiner* — Dipakkumar B Gandhi
(74) *Attorney, Agent, or Firm* — Perspectives Law Group, Corp.

(57) ABSTRACT

A computing system includes: a data block including data pages and each of the data pages includes data sectors and each of the data sectors include sector data and a sector redundancy; a storage engine, coupled to the data block, configured to: apply a first protection across the data pages, apply a second protection across the data sectors, and correct at least one of the data sectors when a sector correction with the sector redundancy failed with the first protection and the second protection.

30 Claims, 5 Drawing Sheets

(56) References Cited

U.S. PATENT DOCUMENTS

| | | | |
|---|---|---|---|
| 2010/0262890 A1* | 10/2010 | Radke | G06F 11/1072 |
| | | | 714/763 |
| 2010/0313100 A1 | 12/2010 | Hicen et al. | |
| 2011/0252184 A1* | 10/2011 | Cho | G06F 3/0608 |
| | | | 711/102 |
| 2013/0080862 A1* | 3/2013 | Bennett | G06F 11/1076 |
| | | | 714/782 |
| 2013/0104005 A1* | 4/2013 | Weingarten | G06F 11/1068 |
| | | | 714/773 |
| 2013/0145082 A1* | 6/2013 | Tamagawa | G06F 12/0246 |
| | | | 711/103 |
| 2014/0245098 A1* | 8/2014 | Sharon | G06F 11/1012 |
| | | | 714/755 |

FOREIGN PATENT DOCUMENTS

| | | |
|---|---|---|
| TW | 201245953 A | 11/2012 |
| WO | 2011116071 A2 | 9/2011 |

* cited by examiner

COMPUTING SYSTEM WITH DATA PROTECTION MECHANISM AND METHOD OF OPERATION THEREOF

CROSS-REFERENCE TO RELATED APPLICATION(S)

This application claims the benefit of U.S. Provisional Patent Application Ser. No. 61/920,465 filed Dec. 23, 2013, and the subject matter thereof is incorporated herein by reference thereto. This application further claims the benefit of U.S. Provisional Patent Application Ser. No. 61/946,710 filed Mar. 1, 2014, and the subject matter thereof is incorporated herein by reference thereto.

TECHNICAL FIELD

An embodiment of the present invention relates generally to a computing system, and more particularly to a system for data protection.

BACKGROUND

Modern consumer and industrial electronics, especially devices such as graphical computing systems, televisions, projectors, cellular phones, portable digital assistants, and combination devices, are providing increasing levels of functionality to support modern life including three-dimensional display services. Research and development in the existing technologies can take a myriad of different directions. As data become more pervasive, existing and new systems need to interoperate and provide data reliability.

Thus, a need still remains for a computing system with data protection mechanism to provide improved data reliability and recovery. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an apparatus, including a data block including data pages and each of the data pages includes data sectors and each of the data sectors include sector data and a sector redundancy; a storage engine, coupled to the data block, configured to: apply a first protection across the data pages, apply a second protection across the data sectors, and correct at least one of the data sectors when a sector correction with the sector redundancy failed with the first protection and the second protection.

An embodiment of the present invention provides a method including providing a data block including data pages and each of the data pages includes data sectors and each of the data sectors include sector data and a sector redundancy; applying a first protection across the data pages; applying a second protection across the data sectors; and correcting at least one of the data sectors when a sector correction with the sector redundancy failed with the first protection and the second protection.

An embodiment of the present invention provides a non-transitory computer readable medium including: providing a data block including data pages and each of the data pages includes data sectors and each of the data sectors include sector data and a sector redundancy; applying a first protection across the data pages; applying a second protection across the data sectors; and correcting at least one of the data sectors when a sector correction with the sector redundancy failed with the first protection and the second protection.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
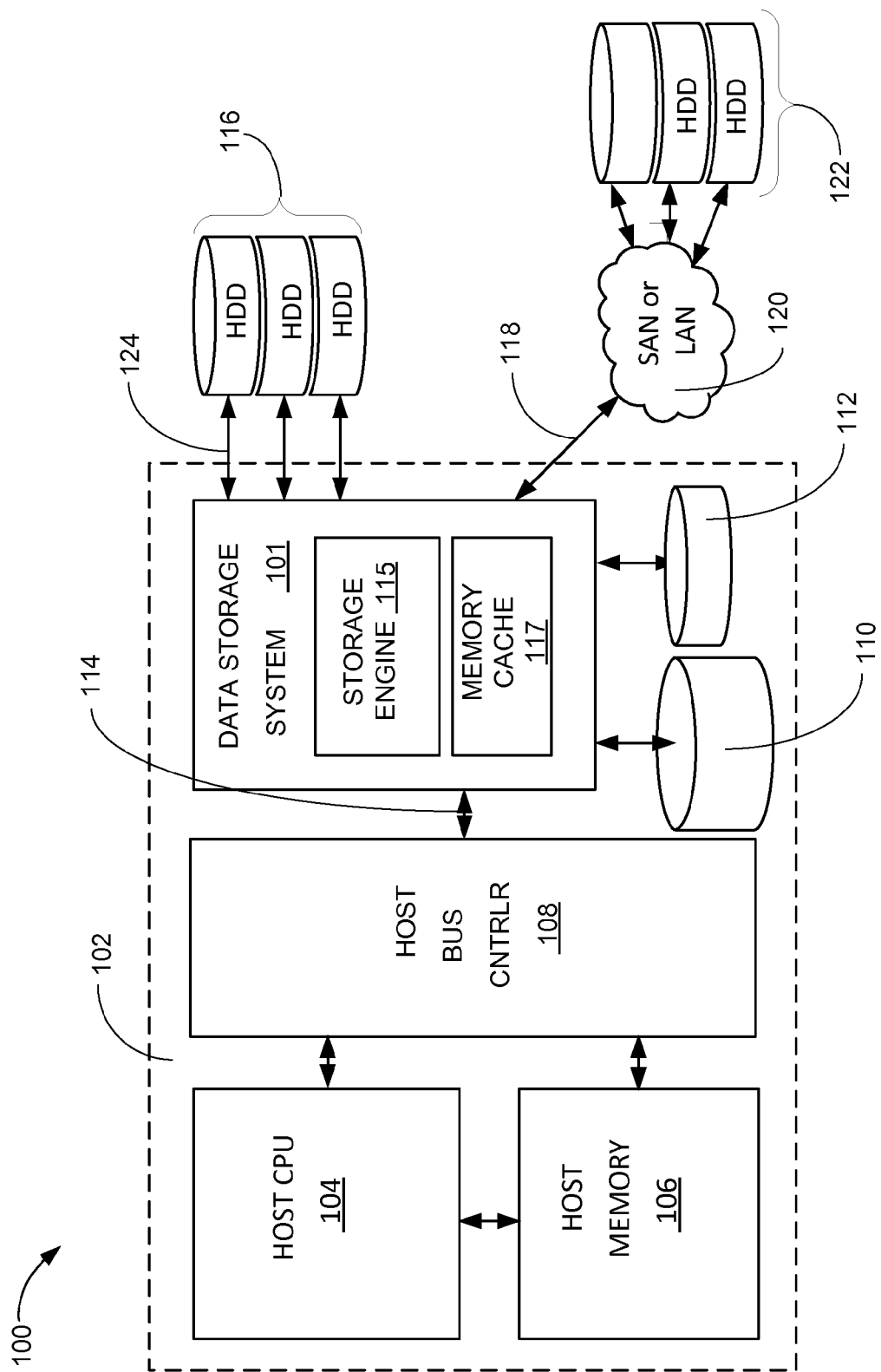
FIG. 1 is a computing system with data protection mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with data protection mechanism in an embodiment of the present invention. The computing system 100 is depicted in FIG. 1 as a functional block diagram of the computing system 100 with a data storage system 101. The functional block diagram depicts the data storage system 101, installed in a host computer 102, such as a server or workstation including at least a host central processing unit 104, host memory 106 coupled to the host central processing unit 104, and a host bus controller 108. The host bus controller 108 provides a host interface bus 114, which allows the host computer 102 to utilize the data storage system 101.

It is understood that the function of the host bus controller 108 can be provided by host central processing unit 104 in some implementations. The host central processing unit 104 can be implemented with hardware circuitry in a number of different manners. For example, the host central processing unit 104 can be a processor, an application specific integrated circuit (ASIC) an embedded processor, a microprocessor, a hardware control logic, a hardware finite state machine (FSM), a digital signal processor (DSP), or a combination thereof.

The data storage system 101 can be coupled to a solid state disk 110, such as a non-volatile memory based storage device having a peripheral interface system, or a non-volatile memory 112, such as an internal memory card for expanded or extended non-volatile system memory.

The data storage system 101 can also be coupled to hard disk drives (HDD) 116 that can be mounted in the host computer 102, external to the host computer 102, or a combination thereof. The solid state disk 110, the non-volatile memory 112, and the hard disk drives 116 can be considered as direct attached storage (DAS) devices, as an example.

The data storage system 101 can also support a network attach port 118 for coupling a network 120. Examples of the network 120 can be a local area network (LAN) and a storage area network (SAN). The network attach port 118 can provide access to network attached storage (NAS) devices 122.

While the network attached storage devices 122 are shown as hard disk drives, this is an example only. It is understood that the network attached storage devices 122 could include magnetic tape storage (not shown), and storage devices similar to the solid state disk 110, the non-volatile memory 112, or the hard disk drives 116 that are accessed through the network attach port 118. Also, the network attached storage devices 122 can include just a bunch of disks (JBOD) systems or redundant array of intelligent disks (RAID) systems as well as other network attached storage devices 122.

The data storage system 101 can be attached to the host interface bus 114 for providing access to and interfacing to multiple of the direct attached storage (DAS) devices via a cable 124 for storage interface, such as Serial Advanced Technology Attachment (SATA), the Serial Attached SCSI (SAS), or the Peripheral Component Interconnect—Express (PCI-e) attached storage devices.

The data storage system 101 can include a storage engine 115 and memory devices 117. The storage engine 115 can be implemented with hardware circuitry, software, or a combination thereof in a number of ways. For example, the storage engine 115 can be implemented as a processor, an application specific integrated circuit (ASIC) an embedded processor, a microprocessor, a hardware control logic, a hardware finite state machine (FSM), a digital signal processor (DSP), or a combination thereof.

The storage engine 115 can control the flow and management of data to and from the host computer 102, and from and to the direct attached storage (DAS) devices, the network attached storage devices 122, or a combination thereof. The storage engine 115 can also perform data reliability check and correction, which will be further discussed later. The storage engine 115 can also control and manage the flow of data between the direct attached storage (DAS) devices and the network attached storage devices 122 and amongst themselves. The storage engine 115 can be implemented in hardware circuitry, a processor running software, or a combination thereof.

For illustrative purposes, the storage engine 115 is shown as part of the data storage system 101, although the storage engine 115 can be implemented and partitioned differently. For example, the storage engine 115 can be implemented as part of in the host computer 102, implemented partially in software and partially implemented in hardware, or a combination thereof. The storage engine 115 can be external to the data storage system 101. As examples, the storage engine 115 can be part of the direct attached storage (DAS) devices described above, the network attached storage devices 122, or a combination thereof. The functionalities of the storage engine 115 can be distributed as part of the host computer 102, the direct attached storage (DAS) devices, the network attached storage devices 122, or a combination thereof.

The memory devices 117 can function as a local cache to the data storage system 101, the computing system 100, or a combination thereof. The memory devices 117 can be a volatile memory or a nonvolatile memory. Examples of the volatile memory can be static random access memory (SRAM) or dynamic random access memory (DRAM).

The storage engine 115 and the memory devices 117 enable the data storage system 101 to meet the performance requirements of data provided by the host computer 102 and store that data in the solid state disk 110, the non-volatile memory 112, the hard disk drives 116, or the network attached storage devices 122.

For illustrative purposes, the data storage system 101 is shown as part of the host computer 102, although the data storage system 101 can be implemented and partitioned differently. For example, the data storage system 101 can be implemented as a plug-in card in the host computer 102, as part of a chip or chipset in the host computer 102, as partially implement in software and partially implemented in hardware in the host computer 102, or a combination thereof. The data storage system 101 can be external to the host computer 102. As examples, the data storage system 101 can be part of the direct attached storage (DAS) devices described above, the network attached storage devices 122, or a combination thereof. The data storage system 101 can be distributed as part of the host computer 102, the direct attached storage (DAS) devices, the network attached storage devices 122, or a combination thereof.

Figure 2:
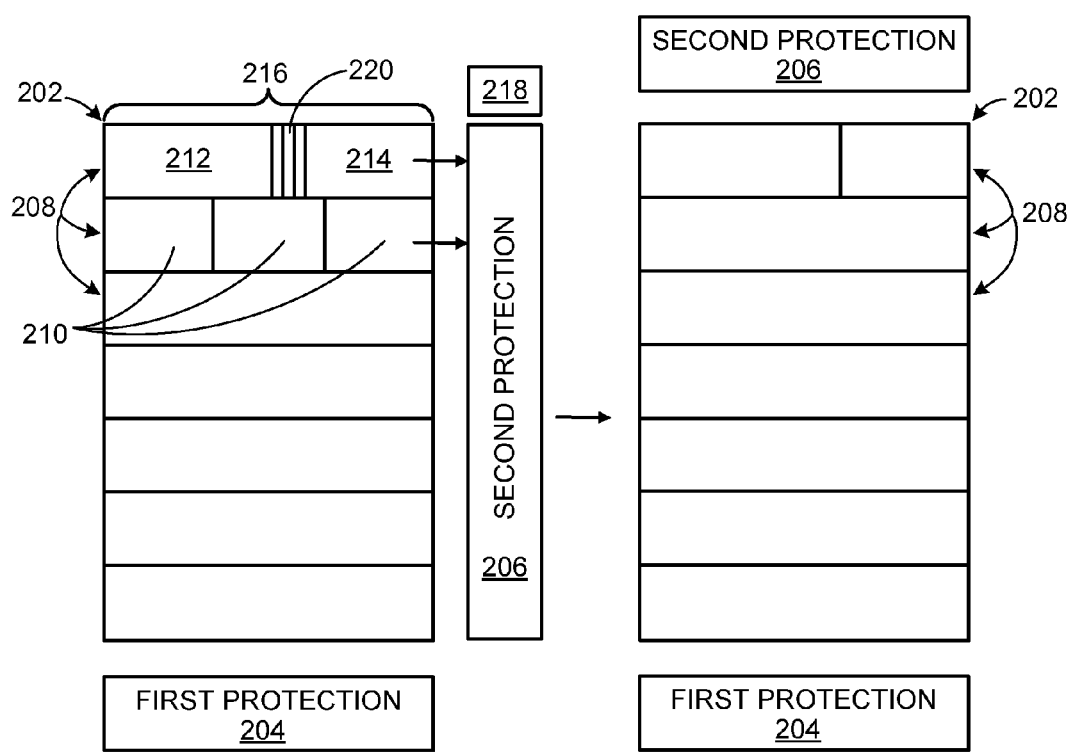
FIG. 2 depicts architectural views of the data protection mechanism in an embodiment.

Referring now to FIG. 2, therein is shown architectural views of the data protection mechanism in an embodiment. FIG. 2 depicts a number representation of the data protection mechanism. The figures depict a data block 202, a first protection 204, and a second protection 206. The figures on the left depict the first protection 204 below the data block 202 while the second protection 206 is shown on the right-hand side of the data block 202. The figures on right depict the first protection 204 relative to the data block 202 as before but the second protection 206 is depicted above the data block 202 at an opposing side to the first protection 204.

The data block 202 includes data to be protected. The data block 202 represent physical storage. The data block 202 can include storage elements from the host computer 102, the network attached storage devices 122, the DAS devices, or a combination thereof. As a more specific example, the data block 202 can represent physical storage including the memory devices 117, the solid state disk 110, the nonvolatile memory 112, the hard disk drives 116 or a combination thereof. The data block 202 can also represent a super block, which represents is a subdivision of a larger storage subsystem. When a storage device is too large to address directly a super block can be used to account for a portion of the storage capacity. As an example, the super block can contain up to a maximum addressable space (in 32 bit addressing that is 4 GB) the number of super blocks can form the entire capacity. An example application where a super block can be utilized is in flash memory where the accounting of wear activity must be maintained for data protection and wear leveling.

The data block 202 can include and be organized into data pages 208. Each of the data pages 208 can include data sectors 210. As an example, the data block 202 can be distributed across multiple devices, such as host computer 102, the direct attached storage (DAS) devices, the network attached storage devices 122, or a combination thereof.

As an example, the data protection mechanism for the data block 202 can be implemented as a 2D RAID parity with the first protection 204, the second protection 206, or a combination thereof. In this example, the data block 202 can be a RAID block. The data page 208 can represent data organized in pages. Each of the data pages 208 can include the data sectors 210. Each of the data sectors 210 can include sector data 212 and the sector redundancy 214, which can be an error correction sector. The sector data 212 and a sector redundancy 214 can make up a codeword 216. The sector redundancy 214 provides capabilities for the error detection, error correction, or a combination thereof.

Examples of sector redundancy 214 error correction codes (ECC), a cyclic redundancy check (CRC), or other types of error detection or correction schemes. As more specific examples, the sector redundancy 214 can be systematic code or nonsystematic code, a block code, or a convolution code. As further examples, the sector redundancy can be a Reed-Solomon code or low density parity check (LDPC) code.

For illustrative purposes, an embodiment is described with two-dimensional (2D) protection for the data block 202 with the first protection 204 and the second protection 206, although it is understood that various embodiments are not limited to 2D protection. For example, other protection can be applied to the same data block 202, the same data sectors 210, or a combination thereof similarly as the first protection 204, the second protection 206, or a combination thereof for N-dimensional protection. As example, various embodiments can be for further protection applied to the data block 202, the data sectors 210, or a combination thereof for 3D, 4D, 5D, etc. protection.

The first protection 204 can also be considered as part of the data block 202 and as one of the data page 208. The first protection 204, in this example, can be considered one sector for RAID parity page for other instances of the data page 208 in the data block 202. The second protection 206 can be a protection for each of the data sectors 210 in each of the data page 208 and can represent a sector for page parity sector for the remaining data sectors 210 in one of the data page 208.

One function of the first protection 204 as the RAID parity page can include providing parity information across the data page 208 in the data block 202 as the RAID block. There are at least 2 ways in which this can be accomplished.

In an embodiment, the first protection 204 as the RAID parity page could be the sum of all the data pages 208 in the data block 202 as the RAID block. However, this would mean there is no protection with the sector redundancy 214 for this page.

In this approach, the first protection 204 as the RAID parity page could be formatted like the data page 208 where each of the data sectors 210 is protected by the sector redundancy 214, such as an ECC. Here, the payload for the data sectors 210 is the parity for payloads of the data page 208. However, there are 3 possibilities for the parity sector, as an example.

First, the parity sector could be used for the page parity like the parity sector for the remaining data sectors 210 on the data page 208. However, this means that the parity sectors on the data page 208 in the data block 202 will not be protected by the RAID parity.

Second, the parity sector could be used for parity for the parity sectors on the data page 208. In this case, the first protection 204 as the RAID parity page would not have page parity information.

Third, there could be two parity sectors. An embodiment can provide parity information for the sectors in the RAID parity page, as the first protection 204, and the other would provide parity information for all the parity sectors in the data block 202 with the second protection 206.

An embodiment of the present invention provides iterative RAID assisted decoding. For this embodiment, the first protection 204 is described as the RAID parity page for third example above. In this case all parity sectors as a portion of the data sectors 210 are covered by RAID parity and the RAID parity page behaves like the data page 208.

Figure 3:
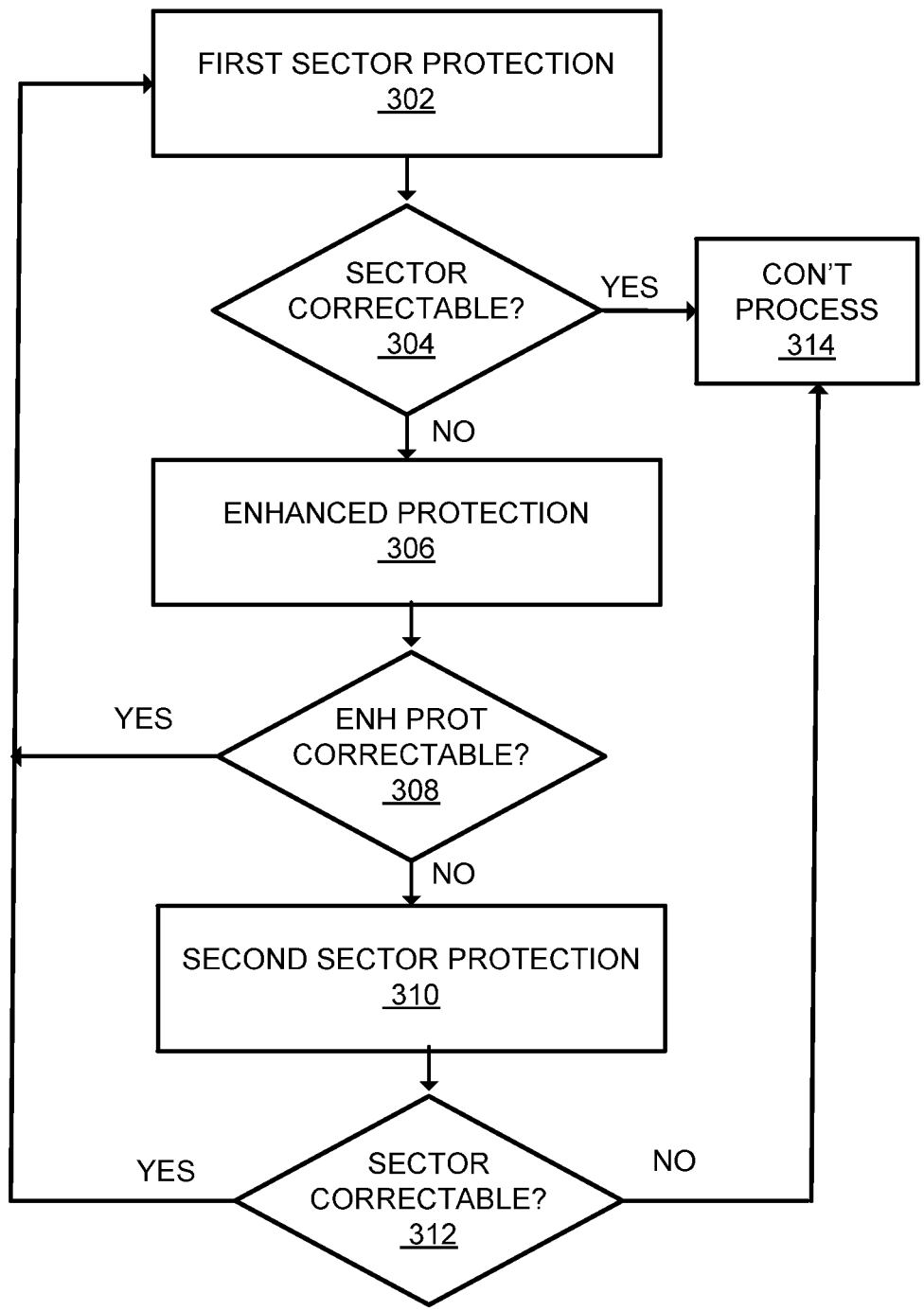
FIG. 3 is a flow chart of the computing system in an embodiment of the present invention.
Figure 4:
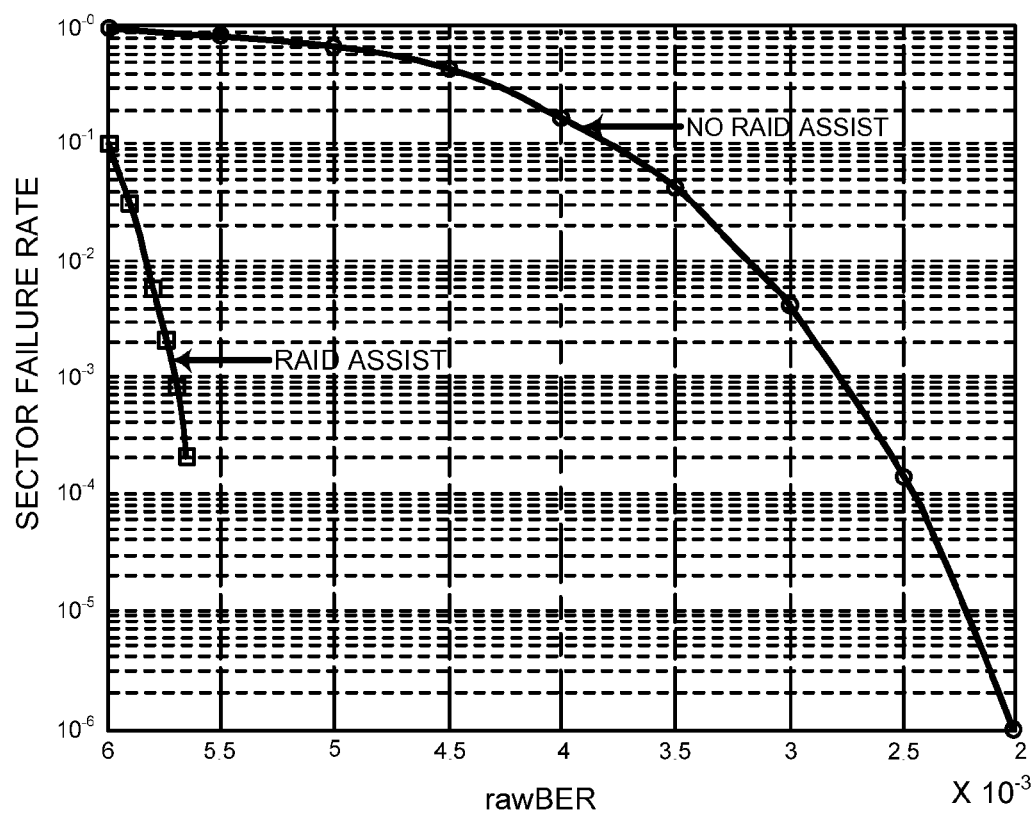
FIG. 4 is a graph depicting an example improvement in an embodiment of the present invention.

Referring now to FIG. 3, therein is shown a flow chart of the computing system 100 in an embodiment of the present invention. In this embodiment, the computing system 100 can decode the entire data block 202 of FIG. 2 as a RAID block. In a block 302, the computing system 100 can first attempt to correct each of the data sectors 210 of FIG. 2 using the sector redundancy 214 of FIG. 2 as the sector ECC.

Further the first protection 204 of FIG. 2 can utilize soft information 218 associated with the data page 208 of FIG. 2. The soft information 218 of FIG. 2 is provides some measure of reliability from a channel. Examples of the soft information can include Flash Log-Likelihood-Ratio (LLR) and can be utilized by the first protection 204.

As a further example, the soft information 218 can also be obtained for the nonvolatile memory 112 of FIG. 1. As a specific example, the nonvolatile memory 112 can include a multi-level cell (MLC) with coupled page and error transition probability due to the degradation that can result in MLC type for the nonvolatile memory 112. For a two-bit per cell example for a MLC nonvolatile memory 112, there are likely errors using Gray code:

11->10
10->00
00->01

In this example, the above transitions are the likely error transition state. And in MLC nonvolatile memory 112, the most significant bit (MSB) page and least significant bit (LSB) page are in different memory page. By reading the error page's coupled page, the computing system 100 can determine the current states of both MSB page and LSB page. From the current states, the computing system 100 can figure out what is the likely state of the correct state. For example, if the error data unit is in MSB page and through XOR, the computing system 100 found out a total set of likely error locations which can be the sum of more than one error data unit. The computing system 100 can read the LSB page of the error data unit. And we can figure out the transition state possibility as shown in the table, as illustrated below:

| Current State | Current MSB | Likely Flip |
| --- | --- | --- |
| 11 | 1 | No |
| 10 | 0 | No |
| 00 | 0 | Yes |
| 01 | 1 | No |

If the current error data unit is LSB page, then the nonvolatile memory 112 can include the likely transition of the state as in the following table:

| Current State | Current LSB | Likely Flip |
| --- | --- | --- |
| 11 | 1 | No |
| 10 | 0 | Yes |
| 00 | 0 | No |
| 01 | 1 | Yes |

By reviewing at the summation of multiple page error pattern and the coupled page current state, the computing system 100 can narrow down the error bit assuming that different pages will have different current state value. For MSB bit page, the computing system 100 can mask out on average 75% of the bits in the data unit for error flip, as an example. For LSB bit page, the computing system 100 can mask out on average 25% of the bits in the data unit for error flip.

Returning to the description of the flow chart, if the block 302 is successful as determined by a block 304, then the process can continue to process the data sector 210. If it is uncorrectable as determined in the block 304, the computing system 100 can apply RAID assisted decoding. As a more specific example, the codeword 216 of FIG. 2 can be a Bose, Chaudhuri, and Hocquenghem (BCH) codeword and the data protection mechanism as a RAID parity as noted above.

For illustrative purposes, the codeword 216 is descried as a BCH codeword, although it is understood the codeword 216 can be other types using different error detection and correction codes. For example, other block codes can be utilized to form the codeword 216. As more specific examples, the codeword 216 can be formed with Reed-Solomon code or Low Density Parity Check (LDPC) code.

Returning the example where the codeword 216 is a BCH codeword, the first protection 204 and the second protection 206 of FIG. 2 can be represented by Q and R, respectively. Let $Q=\{q_i, i=1, \ldots, q\}$ and $R=\{r_i, i=1, \ldots, r\}$, where $q_i$ and $r_j$ are binary vectors of length n. In particular, $q_i$, $i=1,\ldots,q-1$ and $r_i, i=1,\ldots,r-1$ are BCH codeword vectors where and $q_q$ and $r_r$ the parity check vectors defined by $$q_q = c + \sum_{k=1}^{q-1} q_k \text{ and } r_r = c + \sum_{k=1}^{r-1} r_k \qquad \text{(Equation 1)}$$

Assuming that c is uncorrectable in the block 304, the computing system 100 with a block 306 compute the parities:

$$p_Q = c + \sum_{k=1}^{q} q_i \text{ and } p_R = c + \sum_{k=1}^{r} r_i \qquad \text{(Equation 2)}$$

Next, the block 306 generate the vector s bit-wise AND (^) for $p_Q$ and $p_R$:

$$s = p_Q \char`^ p_R \qquad \text{(Equation 3)}$$

where $s(i)=p_Q(i)\char`^p_R(i)$ is the $i^{th}$ bit of s.

The computing system 100 can apply the BCH correcting to the resulting word (i.e. s+c). If c is the only erroneous codeword and s(i)=1 then c(i) is incorrect and will be corrected by this procedure.

If c(i) is incorrect the procedure fails to correct it if there are an odd number of error patterns in Q or R that have an error in position i. This is because at least one of the parity checks will be satisfied so s(i)=0. In addition, if c(i) is correct, then s(i)=1 if both Q and R contain and odd number of error patterns. In this case, the procedure forces c(i) to be incorrect. On the other hand, c(i) will be corrected if there are $0, 2, \ldots, \lfloor q/2 \rfloor$ errors for Q and $0, 2, \ldots, \lfloor r/2 \rfloor$ for R in position i.

Assume c has e>t and that we correct u errors and introduce v errors. The procedure fails if $$e-u+v>t. \qquad \text{(Equation 4)}$$

In other words, the computing system 100 can attempt to correct c by first flipping bits 220 of FIG. 2 in c corresponding to the nonzero positions in s. Where the computing system 100 flip the bits 220 in the uncorrectable sector, as determined by a block 308, corresponding to the nonzero bits 220 in where Q and R are the page and RAID parities and attempt correction again, iterating back to the block 302, with the sector redundancy 214 in a block 310. If the one of the data sectors 210 being decoded is still uncorrectable as determined in a block 312, then an embodiment can continue to apply RAID assisted decoding to the other data page 208 in the data block 202 by iterating back to the block 302.

As a more specific example, the computing system 100 can choose the first sector from the data sectors 210 of FIG. 2 on the first page from the data page 208 as the "target" sector, which can be used to measure performance The computing system 100 can generate all the data pages 208 in the data block 202. In the block 302, the computing system 100 then attempt to decode every one of the data sectors 210 in the target instance of the data page 208 using the sector redundancy 214 of FIG. 2, such as the sector ECC, for each of the data sectors 210. If the target sector is correctable, as determined in the block 304, then an embodiment can be done or continue to process the data sector in the block 314, otherwise an embodiment can apply RAID assist for the target sector in the block 306. If this fails as determined in the block 312, the computing system 100 continues to apply RAID assist to each uncorrectable instance of the data sectors 210 in the target instance of the data page 208.

Whenever RAID assist is successful on a previously uncorrectable instance of the data sectors 210, the computing system 100 can reapply RAID assist for the target sector. This is repeated until the computing system 100 are able to correct the target sector or the computing system 100 has applied RAID assist to every uncorrectable instance of the data sectors 210 in the target sector. If the computing system 100 have attempted correction on every uncorrectable instance of the data sectors 210 on the target page, the computing system 100 repeat the correction process with the next instance of the data page 208. This continues, until the computing system 100 has processed all the data pages 208 or the computing system 100 is able to correctly decode the target sector.

In a further embodiment, the second protection 206 can be implemented with a row-enhanced Hamming code, which is expressed in the following matrix:

$$H = \begin{bmatrix} 1 & 1 & 1 & 1 & 1 & 1 & 1 \\ 1 & 0 & 1 & 0 & 1 & 0 & 1 \\ 0 & 1 & 1 & 0 & 0 & 1 & 1 \\ 0 & 0 & 0 & 1 & 1 & 1 & 1 \end{bmatrix}$$ (Matrix 1)

The row-enhanced Hamming code, as shown in Matrix 1, provides an all 1's row to the parity check matrix expressed below:

$$H = \begin{bmatrix} 1 & 0 & 1 & 0 & 1 & 0 & 1 \\ 0 & 1 & 1 & 0 & 0 & 1 & 1 \\ 0 & 0 & 0 & 1 & 1 & 1 & 1 \end{bmatrix}$$ (Matrix 2)

Matrix 2 is an example of a parity check matrix for an m-bit Hamming code can be constructed by choosing the columns to be all the nonzero binary vectors of length m. Matrix 2 is an example of a parity check matrix for m=3. For this example of H in matrix 2, a nonzero syndrome is the binary representation of the error location. For example, if the received word, w, has an error in location 6, then $s=wH^T=[0\ 1\ 1] \Leftrightarrow 6$.

The row-enhanced Hamming code includes the parity row providing that every combination of 3 columns of row-enhanced Hamming code is linearly independent. As a result, it follows that the Hamming parity code has minimum distance at least 4. In addition, we also note for this choice of H for the row-enhanced Hamming code, we can still identify the error location by shifting the syndrome, left one bit (i.e. shift out the parity check bit).

Referring now to FIG. 3, therein is shown a graph depicting an example improvement in an embodiment of the present invention. The graph depicts the sector error rate along the y-axis and the raw bit error rate along the x-axis. There are two plots depicted on the graph. One depicts the sector failure rate with a worse performance for a given raw bit error rate than the other graph with the RAID parity approach as described in an embodiment of the present invention.

For illustrative purposes, the computing system 100 is described operating on the data block 202 of FIG. 2, the first protection 204 of FIG. 2, and the second protection 206 of FIG. 2 independent of location. It is understood that the data storage system 101 of FIG. 1, the storage engine 115 of FIG. 1, the DAS devices of FIG. 1, the network attached storage devices 122 of FIG. 1 can provide the data block 202, the first protection 204, the second protection 206, or a combination thereof. The data block 202 can also represent the non-volatile memory 112, the memory devices 117, the solid state disk 110, the hard disk drives 116, or a combination thereof.

The functions described in this application can be implemented as instructions stored on a non-transitory computer readable medium to be executed by the host central processing unit 104 of FIG. 1, the data storage system 101, the storage engine 115, or a combination thereof. The non-transitory computer medium can include the host memory of FIG. 1, the DAS devices of FIG. 1, the network attached storage devices 122, the non-volatile memory 112, the memory devices 117, the solid state disk 110, the hard disk drives 116, or a combination thereof. The non-transitory computer readable medium can include compact disk (CD), digital video disk (DVD), or universal serial bus (USB) flash memory devices. The non-transitory computer readable medium can be integrated as a part of the computing system 100 or installed as a removable portion of the computing system 100.

Figure 5:
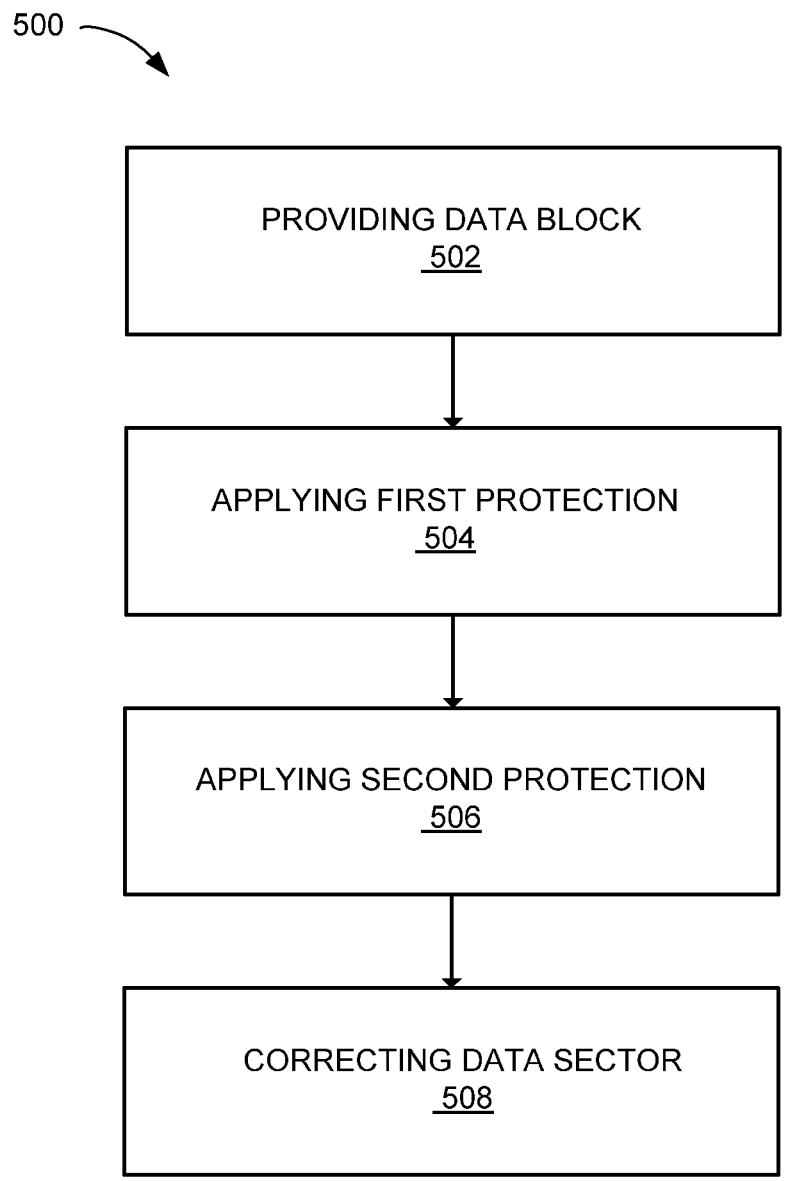
FIG. 5 is a flow chart of a method of operation of a computing system in an embodiment of the present invention.

Referring now to FIG. 5, therein is shown a flow chart of a method 500 of operation of a computing system 100 in an embodiment of the present invention. The method 500 includes: providing a data block including data pages and each of the data pages includes data sectors and each of the data sectors include sector data and a sector redundancy in a block 502; applying a first protection across the data pages in a block 504; applying a second protection across the data sectors in a block 506; and correcting at least one of the data sectors when a sector correction with the sector redundancy failed with the first protection and the second protection in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   a data block, is a physical storage, including data pages, wherein each of the data pages includes data sectors and each of the data sectors includes sector data and a sector redundancy;
   a storage engine, coupled to the physical storage including the data block, configured to:
      apply a first protection across the data pages,
      apply a second protection across the data sectors, and
      correct at least one of the data sectors when a sector correction with the sector redundancy failed including correcting the data sectors with a bitwise AND of the first protection and the second protection.

2. The system as claimed in claim 1 wherein the storage engine is configured to correct the sector data with the sector redundancy after correcting with the first protection and the second protection.

3. The system as claimed in claim 1 wherein the storage engine is configured to apply the first protection as a parity page across the data pages.

4. The system as claimed in claim 1 wherein the storage engine is configured to apply the second protection as a parity sector across the data sectors.

5. The system as claimed in claim 1 wherein the storage engine is configured to correct at least one of the data sectors with the first protection and the second protection by flipping a bit in the data sectors.

6. The system as claimed in claim 1 wherein the storage engine is configured to apply the second protection as a row-enhanced Hamming code.

7. The system as claimed in claim 1 wherein the storage engine is configured to correct the sector data with the sector redundancy.

8. The system as claimed in claim 1 wherein the data block includes a super block.

9. The system as claimed in claim 1 wherein the data block includes a hard disk drive, solid state disk drive, a memory device, or a combination thereof.

10. The system as claimed in claim 1 wherein the storage engine is configured to apply the first protection including soft information associated to at least one of the data pages.

11. A method of operation of a computing system comprising:
   providing a data block as a physical storage, including data pages, wherein each of the data pages includes data sectors and each of the data sectors include sector data and a sector redundancy;
   applying a first protection across the data pages;
   applying a second protection across the data sectors; and
   correcting at least one of the data sectors, included in the physical storage, when a sector correction with the sector redundancy failed including correcting the data sectors by applying a bitwise AND of the first protection and the second protection.

12. The method as claimed in claim 11 further comprising correcting the sector data with the sector redundancy after correcting with the first protection and the second protection.

13. The method as claimed in claim 11 wherein applying the first protection includes applying a parity page across the data pages.

14. The method as claimed in claim 11 wherein applying the second protection includes applying a parity sector across the data sectors.

15. The method as claimed in claim 11 wherein correcting at least one of the data sectors with the first protection and the second protection includes flipping a bit in the data sectors.

16. The method as claimed in claim 11 wherein applying the second protection includes applying a row-enhanced Hamming code.

17. The method as claimed in claim 11 further comprising correcting the sector data with the sector redundancy.

18. The method as claimed in claim 11 wherein providing the data block includes providing a super block.

19. The method as claimed in claim 11 wherein providing the data block includes providing a hard disk drive, solid state disk drive, a memory device, or a combination thereof.

20. The method as claimed in claim 11 wherein applying the first protection includes applying soft information associated to at least one of the data pages.

21. A non-transitory computer readable medium including instructions for execution, the medium comprising:
   providing a data block as a physical storage, including data pages, wherein each of the data pages includes data sectors and each of the data sectors include sector data and a sector redundancy;
   applying a first protection across the data pages;
   applying a second protection across the data sectors; and
   correcting at least one of the data sectors, included in the physical storage, when a sector correction with the sector redundancy failed including correcting the data sectors by applying a bitwise AND of the first protection and the second protection.

22. The medium as claimed in claim 21 further comprising correcting the sector data with the sector redundancy after correcting with the first protection and the second protection.

23. The medium as claimed in claim 21 wherein applying the first protection includes applying a parity page across the data pages.

24. The medium as claimed in claim 21 wherein applying the second protection includes applying a parity sector across the data sectors.

25. The medium as claimed in claim 21 wherein correcting at least one of the data sectors with the first protection and the second protection includes flipping a bit in the data sectors.

26. The medium as claimed in claim 21 wherein applying the second protection includes applying a row-enhanced Hamming code.

27. The medium as claimed in claim 21 further comprising correcting the sector data with the sector redundancy.

28. The medium as claimed in claim 21 wherein providing the data block includes providing a super block.

29. The medium as claimed in claim 21 wherein providing the data block includes providing a hard disk drive, solid state disk drive, a memory device, or a combination thereof.

30. The medium as claimed in claim 21 wherein applying the first protection includes applying soft information associated to at least one of the data pages.

* * * * *